United States Patent [19]
Barrett et al.

[11] 3,845,928
[45] Nov. 5, 1974

[54] SPRING LOADED TRANSDUCER BRACKET

[75] Inventors: Burton M. Barrett; James A. De Voe, both of Tulsa, Okla.

[73] Assignee: Lowrance Electronics, Inc., Tulsa, Okla.

[22] Filed: July 30, 1973

[21] Appl. No.: 383,593

[52] U.S. Cl.................. 248/291, 403/111, 403/112, 340/85
[51] Int. Cl........................................... F16m 13/00
[58] Field of Search........ 248/291, 292, 293, 475 B, 248/4; 403/111, 113, 117, 120; 340/85

[56] References Cited
UNITED STATES PATENTS

| | | | |
|---|---|---|---|
| 2,646,950 | 7/1953 | Nelson et al. | 248/1 |
| 2,739,778 | 3/1956 | Krone et al. | 248/292 |
| 3,393,891 | 7/1968 | Murray | 248/291 |
| 3,521,225 | 7/1970 | Kursman et al | 248/291 X |
| 3,714,619 | 1/1973 | Morgan | 248/291 X |
| 3,729,162 | 4/1973 | Salvato | 248/291 |

*Primary Examiner*—William H. Schultz
*Attorney, Agent, or Firm*—Head & Johnson

[57] ABSTRACT

An apparatus for pivotally supporting a transducer or other device to a boat transom including a mounting bracket having a base portion for attachment to the boat transom, the mounting bracket having integral parallel left and right wing portions extending from opposite ends thereof each having an aligned opening therein and including an integral tubular collar around each opening, a pivot bracket including a base portion to which a transducer or the like may be attached, the base portion having integral left or right wing parallel portions extending from opposite ends thereof, and each having an aligned opening therein and including an integral tubular collar around each opening, the pivot bracket being positioned within the mounting bracket with the tubular collars in alignment, and a pair of coil springs, one positioned within the left tubular collar of the pivot and mounting bracket and the other positioned in the right tubular collars of the pivoting and mounting brackets, the external diameter of the coil springs being slightly less than the internal diameter of the collars so that the springs serve as an axial for the rotation of the pivot bracket relative to the mounting bracket, one end of each of the springs being affixed to the mounting bracket and the other end being affixed to the pivot bracket, the springs providing resilient biasing force rotating the pivot bracket relative to the mounting bracket towards the rest position.

4 Claims, 3 Drawing Figures

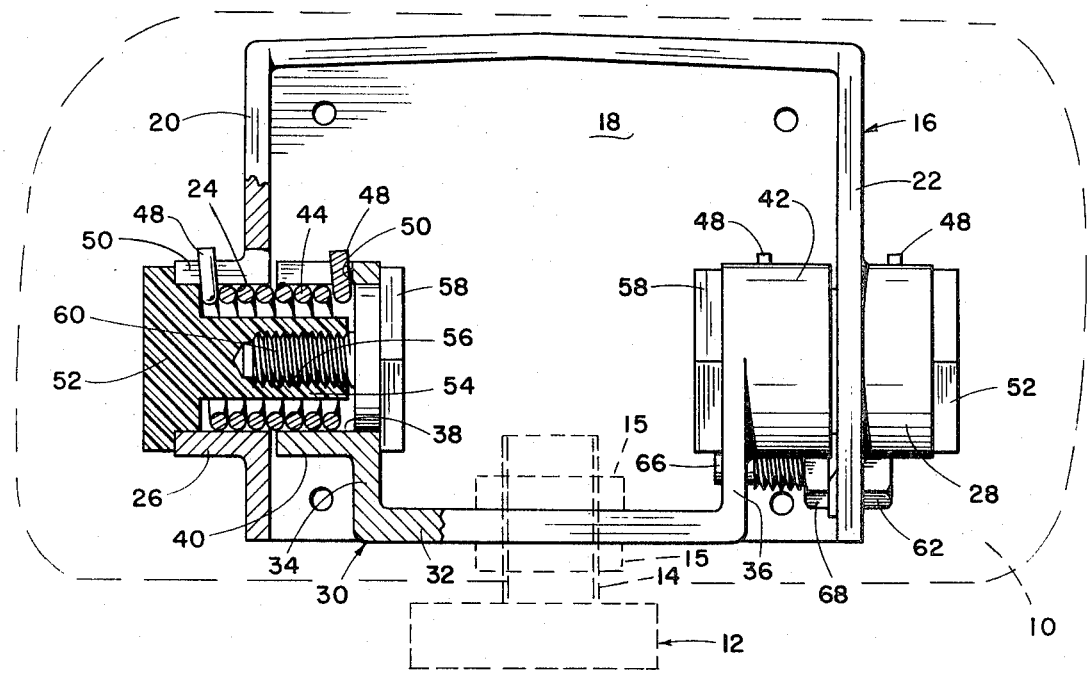
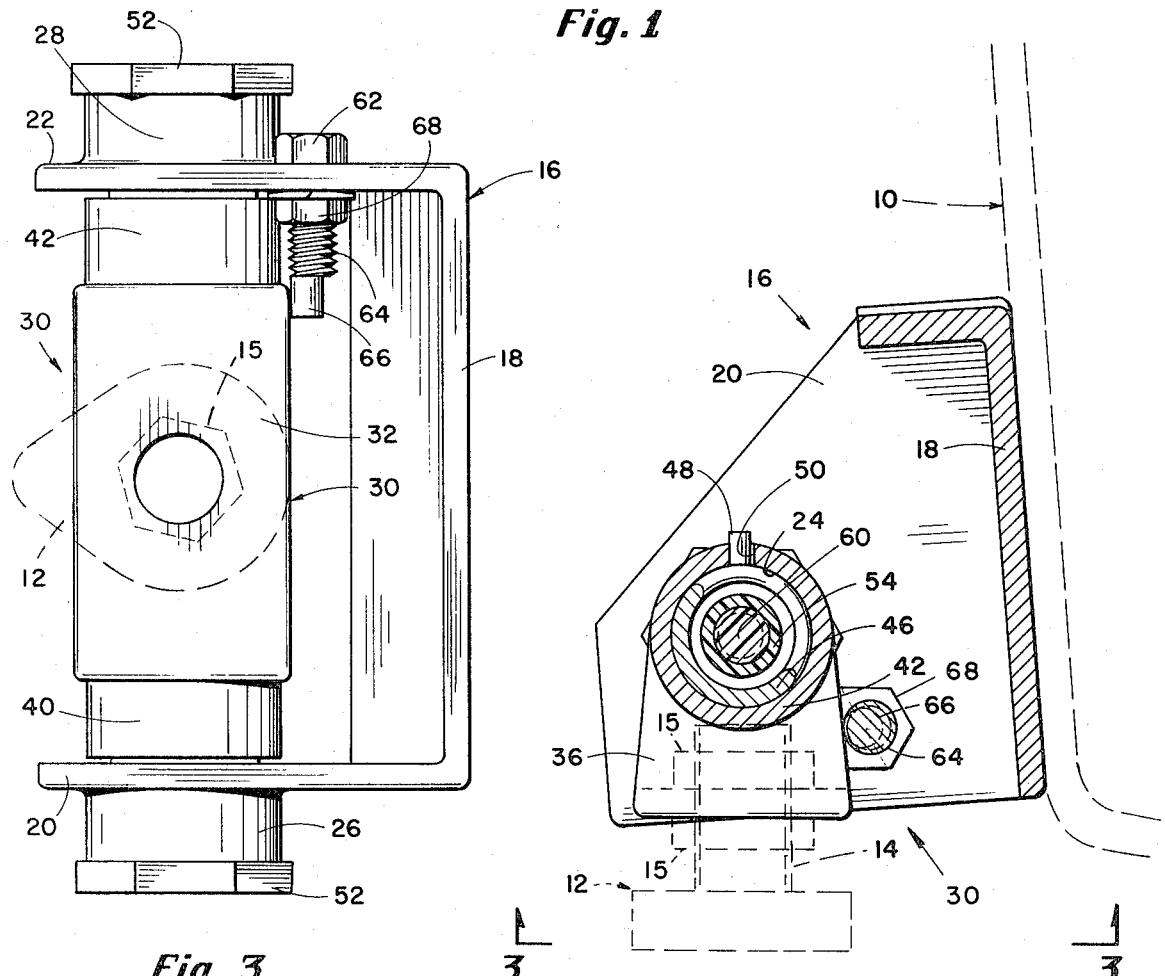

3,845,928

SPRING LOADED TRANSDUCER BRACKET

BACKGROUND, SUMMARY AND OBJECTS OF THE INVENTION

An item in common use today by boat owners is a sonar apparatus to indicate the depth of water in which the boat is situated and the presence of fish in the water. The typical depth indicator or fish locator is a sonar apparatus which functions by transmitting pulses of sonic energy in the water, receiving the reflected echos, and indicating the elapsed time between the transmission and the receipt of an echo as an indication of the depth of the echo producing object. The device for transmitting sound pulses and receiving echos thereof is termed a transducer. Typically, a transducer includes a housing having a crystal therein with electrical conductors connected to the crystals. When electrical energy is applied to the crystals the crystal physically vibrates, generating a sound wave in the water. When sound energy is reflected and strikes the crystals the obverse takes place, that is, the vibration generates an electrical signal in the crystal. The transducer must be accurately positioned below the surface of the water for the sonar apparatus to function properly.

The usual means of attaching a sonar transducer is to attach the device to the transom of the boat. For this purpose a simple angular bracket may be utilized having one leg of the bracket attached to the boat transom and the other leg of the bracket extending so as to be approximately parallel to the surface of the water. An opening in the parallel portion receives a threaded portion of the transducer and thereby supports the transducer such that the lower surface thereof is horizontal and below the surface of the water. The transducer must extend below the surface of the water which means that generally the transducer must extend below the plane of the boat bottom surface. This means that with the boat in motion any object in the water encountered by the boat may be struck by the transducer. Thus the transducer is easily damaged.

The present invention is directed towards a means of mounting a transducer in a pivoted arrangement so that if an object in the water strikes the transducer as the boat is in motion the transducer is free to pivot so as to pass over the object and automatically return to the required position.

It is therefore an object of this invention to provide an apparatus for pivotally supporting a transducer or other similar device to a boat transom.

More particularly, an object of this invention is to provide an apparatus for pivotally supporting a transducer to a boat transom including means whereby the device is free to pivot in the event the transducer is struck by an obstruction in the water and in an arrangement wherein the transducer automatically returns to the correct position after the obstruction is passed over.

Another object of this invention is to provide a bracket for pivotally supporting a transducer to a boat transom including coiled springs for biasing the transducer to the correct position and allowing pivotation thereof, and in which the coil springs serve as the axis of pivotation of the transducer.

These and other objects will be fulfilled in the following description and claims, taken in conjunction with the attached drawings.

DESCRIPTION OF VIEWS

FIG. 1 is a rear end view of the apparatus shown affixed to the transom of a boat and showing a transducer in dotted outline as supported by the apparatus.

FIG. 2 is a side view of the apparatus affixed to the transom of a boat with the transducer supported by the apparatus shown in dotted outline.

FIG. 3 is a bottom view of the apparatus with a transducer supported by it in dotted outline.

DETAILED DESCRIPTION

Referring to the drawings the apparatus is shown affixed to the transom 10 of a boat and supporting a transducer 12 shown in dotted outline. The transducer includes an integral outwardly extended threaded shank portion 14 having nuts 15 by which the transducer is secured to the apparatus.

The apparatus itself includes a mounting bracket, generally indicated by the numeral 16, having a flat base portion 18 which is attached to the boat transom 10. The mounting bracket has an integral left wing 20 portion and a right wing portion 22. The wing portions 20 and 22 extend from opposite sides of the base portion 18 and are parallel to each other. Each of the wing portions 20 and 22 has an opening 24 therein spaced from the base portion 18 (only the opening 24 in the left wing portion 20 is seen). The opening 24 in the left wing portion includes an integral tubular collar 26 and, in like manner, the opening in the right wing portion 22 has an integral tubular collar 28 surrounding it. The tubular collars 26 and 28 extend in directions opposite each other and are in axial alignment.

The second basic portion of the apparatus is a pivot bracket, generally indicated by the numeral 30. The pivot bracket includes a horizontal base portion 32 having an integral left wing 34 and right wing 36. The wing portions 34 and 36 extend from opposite ends of the base portion 32 and are parallel to each other. Each of the wing portions includes an opening 38 (only the opening 38 in the left wing portion 34 being seen). Surrounding each of the openings 38 is a tubular collar. The left wing portion 34 includes tubular collar 40 and the right wing portion 36 includes tubular collar 42. The collars 40 and 42 extend in opposite directions from each other and are in axial alignment.

The internal diameter of the pivot bracket collars 40 and 42 is substantially equal to the internal diameter of the mounting bracket collars 26 and 28. The distance between the outer ends of the pivot bracket collars 40 and 42 is slightly less than the interior distance between the base portion left and right wing portions 20 and 22. The pivot bracket is mounted so that the collars 40 and 42 are in axial alignment with the mounting bracket collars 26 and 28.

A coiled spring 44 is positioned within the left tubular collars 26 and 40 and in like manner a second coiled spring 46 (see FIG. 2) is received in the right collars 42 and 28. The external diameter of the springs 44 and 46 is substantially equal to the internal diameters of the collars so that the coil springs serve as pivot points for the pivotation of pivot bracket 30 relative to mounting brackets 16.

Each of the springs 44 and 46 includes at each end thereof a radially extending portion 48. Each of the collars has a small diameter opening 50 therein which receives a spring extending portion 48. By proper tension in each of the springs 44 and 46 the pivot bracket 30 is biased towards the mounting bracket base portion 18. By means of the springs 44 and 46 the transducer 12 is retained in proper position relative to the boat transom 10 but is permitted to pivot if an object strikes the transducer 12. Upon pivotation springs 44 and 46 return the pivot bracket 30 and thereby the transducer 12 to the proper position.

Received in each pair of mounting bracket collars 26 and 28 is a retainer 52 having a shank portion 54 with an internally threaded recess 56. A second retainer 58 includes a threaded portion 60 which is threadably received in the recess 56 in the first retainer 52. In this way each of the tubular collars are closed and the pivot bracket 30 is retained in pivotal relationship relative to the mounting bracket 16.

A bolt 62 has the threaded portion 64 extending through an opening in the bracket right wing portion 22 (the opening not being seen). The inner end of the bolt is engaged by the pivot bracket right wing portion 36. Thus the bolt 62 serves to limit the inward pivotation of the pivot bracket and thereby adjustably positions the transducer in proper relationship to the boat transom.

It can be seen that means may be provided for adjusting the degree of maximum inward pivotation of the pivot bracket 30 relative to the mounting bracket 16. As one example, the inner end 66 of the bolt 62 is eccentric. Thus, by rotatable position of the bolt 32 the angle the pivot bracket base portion 32 makes relative to the boat transom 10 may be adjusted. A lock nut 68 retains bolt 62 in the selected position. This is one example of means for selectably adjusting the pivot bracket rest position so that the transducer 12 is supported in the precise attitude required relative to boat transom 10.

The invention provides a mounting arrangement for a transducer allowing the transducer to pivot when engaged by an object in the water as the boat is in motion and provides for automatic return of the transducer to the proper rest position. The mounting device utilizes the coil springs which bias the device towards the rest position as the pivotal axis. Thus the device accomplishes the desired results with the minimum number of component parts and with maximum simplicity.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claim or claims, including the full range of equivalency to which each element thereof is entitled.

What is claimed:

1. An apparatus for pivotally supporting a transducer or other device to a boat transom, comprising:

a mounting bracket including a base portion for attachment to a boat transom, the mounting bracket having integral left and right wing portions extending from opposite sides thereof, the wing portions being parallel to and spaced from each other and each having an aligned opening therein spaced from the base portion and including an integral tubular collar around each opening;

a pivot bracket including a base portion to which a transducer or the like may be attached, the base portion having integral left and right wing portions extending from opposite sides thereof, the wing portions being parallel to and spaced from each other and each having an aligned opening therein spaced from the base portion and including an integral tubular collar around each opening, the internal diameter of the pivot bracket collars being substantially equal to the internal diameter of the mounting bracket tubular collars, the pivot bracket being positioned within said mounting bracket with the tubular collars in alignment; and a pair of coiled springs, one positioned within the left tubular collars of the pivot and mounting brackets and the other positioned in the right tubular collars of the pivot and mounting brackets, the external diameter of the coiled springs being slightly less than the internal diameter of the collars whereby the springs serve as axles for the rotation of said pivot bracket relative to the mounting bracket, one end of each spring being affixed to the mounting bracket and the other end being affixed to the pivot bracket, said spring providing resilient biasing force tending to pivot the pivotal bracket relative to the mounting bracket towards a rest position.

2. A bracket for pivotally supporting a transducer or other device to the transom of a boat according to claim 1 including stop means for limiting the pivotation of said pivot bracket relative to said mounting bracket.

3. A bracket for pivotally supporting a transducer or other device to the transom of a boat according to claim 2 wherein said stop means includes a bolt extending through an opening in one of said mounting bracket wing portions, said bolt being engaged by the corresponding wing portion of said pivot bracket.

4. A bracket for pivotally supporting a transducer or other device to the transom of a boat according to claim 3 in which said bolt includes an eccentric portion whereby the bolt may be selectably rotatably positioned to vary the pivotal relationship between said mounting bracket and said pivot bracket in rest position.

* * * * *